(12) United States Patent
Larson et al.

(10) Patent No.: US 8,069,308 B2
(45) Date of Patent: Nov. 29, 2011

(54) CACHE POOLING FOR COMPUTING SYSTEMS

(75) Inventors: Aaron Larson, Shoreview, MN (US);
Ryan Roffelsen, Tigard, OR (US);
Larry James Miller, Black Canyon City, AZ (US)

(73) Assignee: Honeywell International Inc., Morristown, NJ (US)

( * ) Notice: Subject to any disclaimer, the term of this patent is extended or adjusted under 35 U.S.C. 154(b) by 781 days.

(21) Appl. No.: 12/030,635

(22) Filed: Feb. 13, 2008

(65) Prior Publication Data
US 2009/0204764 A1    Aug. 13, 2009

(51) Int. Cl.
*G06F 12/00* (2006.01)
(52) U.S. Cl. .................................. 711/117; 711/129
(58) Field of Classification Search .................. 711/117, 711/129
See application file for complete search history.

(56) References Cited

U.S. PATENT DOCUMENTS

| | | | |
|---|---|---|---|
| 5,586,293 A | 12/1996 | Baron et al. | |
| 6,016,531 A | 1/2000 | Rixner et al. | |
| 6,161,166 A | 12/2000 | Doing et al. | |
| 6,182,194 B1 | 1/2001 | Uemura et al. | |
| 6,397,301 B1 | 5/2002 | Quach et al. | |
| 6,574,682 B1 | 6/2003 | Chan | |
| 2005/0144401 A1* | 6/2005 | Pantalone et al. | 711/151 |
| 2005/0312141 | 6/2005 | Sturges et. al. | |
| 2005/0235124 A1* | 10/2005 | Pomaranski et al. | 711/170 |
| 2006/0184741 A1 | 8/2006 | Hrusecky et al. | |
| 2007/0083728 A1 | 4/2007 | Nijhawan et al. | |
| 2007/0168642 A1* | 7/2007 | Wilson | 711/206 |
| 2008/0140937 A1* | 6/2008 | Nalawade et al. | 711/119 |
| 2008/0285652 A1* | 11/2008 | Oxman et al. | 375/240.16 |
| 2009/0300631 A1* | 12/2009 | Karlapalem et al. | 718/103 |

FOREIGN PATENT DOCUMENTS

| | | |
|---|---|---|
| EP | 0529217 | 3/1993 |
| EP | 1111511 | 6/2001 |
| EP | 1182567 | 2/2002 |
| GB | 2284911 | 6/1995 |

OTHER PUBLICATIONS

European Patent Office, "European Search Report", Jul. 20, 2009, Published in: EP.
Kumar et. al., "Compiling for Instruction Cache Performance on a Multithreaded Architecture," 35th International Symposium on Microarchitecture, Nov. 2002.
Chu et. al., "An Instruction Cache Architecture for Parallel Execution of Java Threads," The Fourth International Conference on Parallel and Distributed Computing, Applications and Technology, Aug. 2003.

* cited by examiner

*Primary Examiner* — Hashem Farrokh
(74) *Attorney, Agent, or Firm* — Fogg & Powers (57) ABSTRACT

In a computing system a method and apparatus for cache pooling is introduced. Threads are assigned priorities based on the criticality of their tasks. The most critical threads are assigned to main memory locations such that they are subject to limited or no cache contention. Less critical threads are assigned to main memory locations such that their cache contention with critical threads is minimized or eliminated. Thus, overall system performance is improved, as critical threads execute in a substantially predictable manner.

19 Claims, 8 Drawing Sheets

CACHE POOLING FOR COMPUTING SYSTEMS

FIELD

The embodiments herein relate to computing devices assigning threads to memory locations in order to achieve performance goals.

BACKGROUND

As the microprocessor industry continues to improve the performance of central processing units (CPUs), more emphasis is being placed on designs supporting greater degrees of parallelism in CPUs, as well as multiple CPUs on a single chip. This emphasis is due to, at least in part, an increased need for thread-level parallelism. As is well known in the art, multiple applications may execute in parallel on a multi-tasking operating system. Furthermore, each of these applications may be further divided into multiple threads of execution. Each thread may be also referred to as a "process" or "task." A highly-parallel system is able to execute potentially many threads concurrently, and thereby improve system performance.

However, threads in such a system may contend for access to memory. Memory in computer systems is typically hierarchical, with small amounts of fast memory located nearby the CPU(s) in a cache, while a larger amount of slower memory is available in main memory (e.g., RAM) and an even larger amount of yet slower memory is available in secondary storage (e.g., a disk drive). A thread may require memory to hold its instructions and data. Instructions are the actual microprocessor codes that a CPU will execute on behalf of a thread. The set of all instructions that comprise an executable program is sometimes referred to as the program's "image." Data is the memory that a thread uses during execution.

Given that a CPU can typically read or write cache memory in a small number of clock cycles, it is desirable to maintain a copy of a thread's instructions and data resident in the cache. However, when the cache is shared between all of the threads that are executing in the system, any one of these threads is unlikely to have all of its instructions or data cache-resident. This can lead to worst-case situations in which each thread that is task-switched into a CPU has no cache-resident instructions or data, because other thread(s) have used all of the available cache lines. The cache then must reload the appropriate instruction and data from slower main memory, which delays execution of the thread. This phenomenon is known as "thrashing" the cache.

In real-time computer systems, such as avionics command and control systems, critical threads may need to execute a certain number of times within a given time frame. When critical threads contend with one another or with other threads for cache space, the overall efficiency of the system is reduced. For example, the system might have to be configured to assume that a worst-case cache delay occurs each time a critical thread is task-switched into a CPU. It is desirable to allow a real-time system to operate correctly on inexpensive, off-the-shelf hardware. However, cache-thrashing of critical threads may result in the system being able to support fewer threads, or the system requiring faster and more expensive hardware.

As is known in the art, the term "CPU" can refer to a single CPU core of a multi-CPU integrated circuit, or die. For purposes of simplicity, the term "CPU" shall include, but not be limited to, a CPU core that may operate in either a single core or a multi-core system.

SUMMARY

An improvement to computing systems is introduced that allows a cache to be logically divided so that contention between multiple threads is limited, or eliminated. The system assigns memory to threads so that portions of a cache will be reserved for one or more threads. Other threads may share the remaining portions of the cache. With this improvement, inexpensive, off-the-shelf hardware can be used to enable a multi-threaded software system that may have specific real-time processing and latency requirements.

DESCRIPTION

Figure 1:
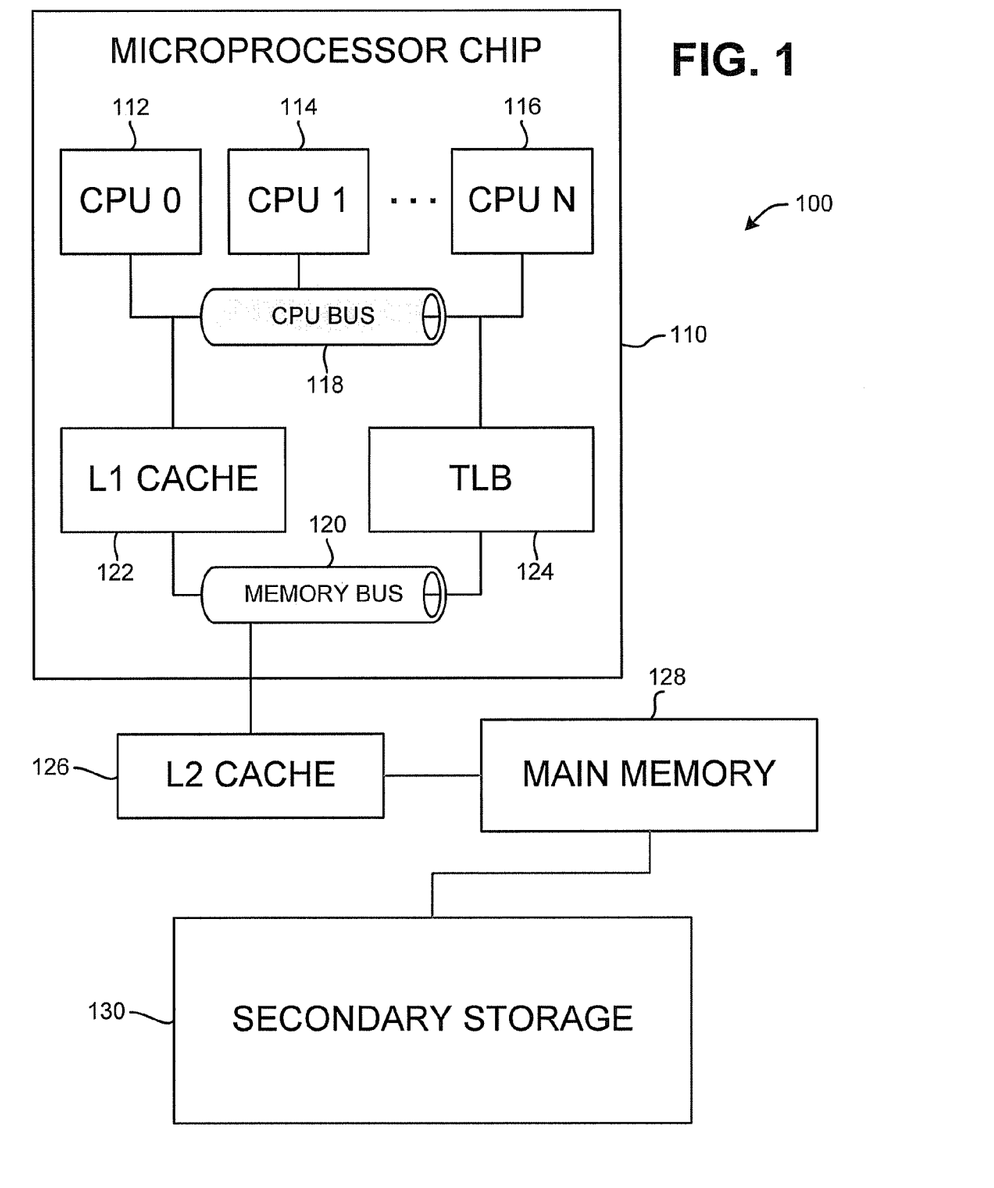
FIG. 1 is a block diagram of a computing system.

FIG. 1 comprises a multi-core CPU system 100 with an associated memory hierarchy. The microprocessor chip 110 comprises N CPUs, or cores, 112, 114, 116, each capable of executing one or more threads in parallel. Each CPU is coupled, via a CPU bus 118, to at least a level 1 (L1) cache 122 and a translation lookaside buffer 124 (TLB). The L1 cache 122 and TLB 124 contain memory and computing logic. A memory bus 120 couples the L1 cache 122 and TLB 124 to a level 2 (L2) cache 126. Similar to L1 cache 122 and TLB 124, L2 cache 126 contains memory and computing logic. L2 cache 126 is coupled to main memory 128, and main memory 128 is in turn coupled to secondary storage 130. Without loss of generality, and for the sake of illustration and enablement, it can be assumed that an L2 cache 126 is a smaller, faster memory than main memory 128, and that a secondary storage 130 is larger, slower memory than main memory 128.

It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, as in most computer architectures, those skilled in the art will appreciate that many of the elements described herein are functional entities that may be implemented as discrete components or in conjunction with other components, in any suitable combination and location. For example, CPU bus 118 may consist of multiple independent busses so that each CPU, 112, 114, 116, can access the L1 cache 122 and TLB 124 without contending for a CPU bus with the other CPUs. Furthermore, the system 100 might not comprise an L1 cache 122 and an L2 cache 126, but could comprise a single cache or more than two caches. Yet further, L2 cache 126 may be either within the microprocessor chip 110 or part of another chip in the system. Even further, a system may contain multiple independent main memories and secondary storages, not shown in FIG. 1. Each unit of memory in system 100 may comprise semiconductor memory, magnetic memory, optical memory, acoustic memory, biological memory, or any combination of these memory technologies, or any other memory technology used in conjunction with computational devices.

The purpose of the caches 122 and 126 in system 100 is to temporarily hold instructions, data, or both, that are being used by tasks executing on one of CPUs 112, 114, 116. As is known to those skilled in the art, patterns of computer memory access exhibit both spatial and temporal locality of reference. That is, once a main memory 128 location $M_X$ is accessed, it is likely that a nearby main memory 128 location $M_Y$ will also be accessed, and it is also likely that main memory 128 location $M_X$ will again be accessed soon. Thus, it is advantageous to store data from recently-accessed main memory 128 locations and their neighboring locations in a fast-memory cache, such as L2 cache 126, because it is likely that a CPU 112, 114, 116 will once again have to access one of those main memory 128 locations. By storing the data from main memory 128 locations in L2 cache 126, the system avoids the latency of having to access main memory 128 or secondary storage 130 to read the data.

While the basic unit of storage in many programming languages is the byte (8 bits), most CPUs 112, 114, 116 use a unit of operation that is several bytes. For example, in a 32-bit microprocessor, memory addresses are typically 32 bits wide. Thus, for main memories that are byte-addressable, a 32-bit microprocessor can address $2^{32}$ (4,294,967,296) individual bytes (4 Gigabytes), where those bytes are numbered 0 through 4,294,967,295. Due to spatial locality of reference, most microprocessors cache main memory 128 in groups of bytes called "lines." Each line is a fixed number of contiguous bytes. For example, a 32-bit microprocessor might have a line size of 16 bytes, which means that when a byte from main memory 128 is fetched into L2 cache 126, the rest of the line is brought into L2 cache 126 as well. Thus, when referring to locations in both main memory 128 and a L2 cache 126, depending on context, the granularity may be any of various sizes between bytes and lines.

Figure 2:
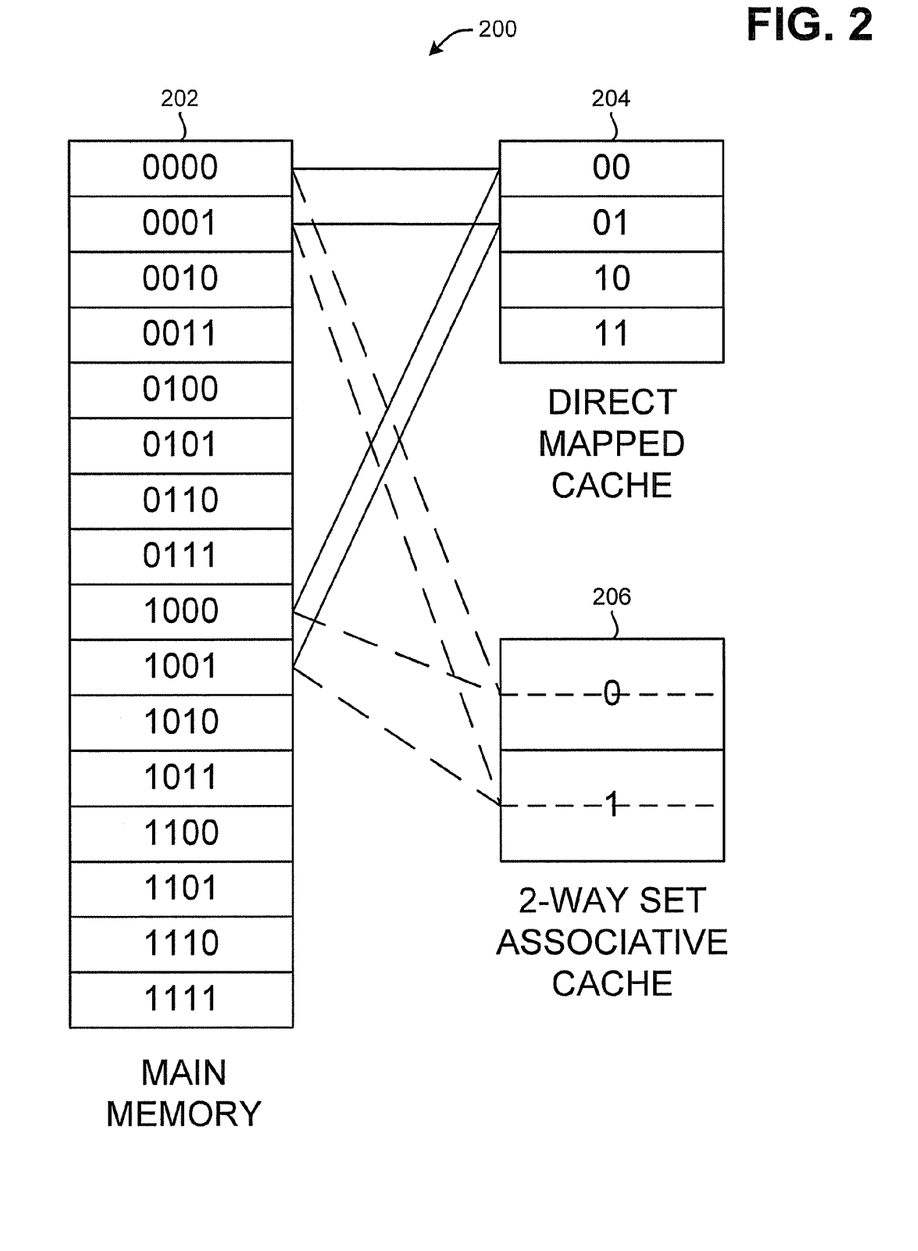
FIG. 2 is a block diagram of a caching system.

Regardless of the mechanics of memory access, the fact that L2 cache 126 is typically much smaller than main memory 128 means that not all main memory 128 locations can be simultaneously resident in L2 cache 126. In order to maintain performance, L2 cache 126 typically will execute a simple operation to map a main memory 128 location to a limited number of L2 cache 126 locations. FIG. 2 comprises exemplary cache mappings. For purposes of illustration, memory system 200 comprises main memory 128 with 16 lines, direct mapped cache 204 with 4 lines, and 2-way set associative cache 206, also with 4 lines. The main memory 128 lines are numbered in binary 0000 (0 in decimal) to 1111 (15 in decimal). The direct mapped cache 204 lines are numbered in binary 00 (0 in decimal) to 11 (3 in decimal). The 2-way set associative cache 206 lines are grouped into sets comprising two lines each, where the sets are numbered in binary 0 (0 in decimal) to 1 (1 in decimal).

Main memory 128 is mapped to direct mapped cache 204 by performing a modulus operation where the divisor is the number of lines in direct mapped cache 204. Thus, in the example of FIG. 2, a main memory 128 line M is mapped to direct mapped cache 204 line C with the operation M mod 4. This means that main memory 128 line 0000 is mapped to direct mapped cache 204 line 00, main memory 128 line 0001 is mapped to direct mapped cache 204 line 01, and so on. Memory contention occurs when the same or different threads access two or more main memory 128 lines that map to the same direct mapped cache 204 line. For example, assume that thread T1 has recently accessed main memory 128 line 0000 and this main memory 128 line has been mapped to direct mapped cache 204 line 00. Then thread T2 accesses main memory 128 line 1000, which also maps to direct mapped cache 204 line 00. Direct mapped cache 204 will replace its copy of main memory 128 line 0000 with main memory 128 line 1000.

If thread T1 subsequently accesses main memory 128 line 0000 again, the direct mapped cache 204 will replace its copy of main memory 128 line 1000 with main memory 128 line 0000. In this example, direct mapped cache 204 line 00 is being thrashed, and the system 200 is suffering from poor performance due to having to access main memory 128 frequently.

In order to overcome some of the limitations of direct mapped caches, set associative caches may be used. In an n-way set associative cache, the cache space is divided into sets, each comprising n lines. Main memory 128 lines are mapped to a set, and within each set a main memory 128 line can be mapped to any cache line. The mapping is determined by performing a modulus operation to select a set, where the divisor is the number of sets in the cache. Then, a line is chosen from within that set. Thus, following the example above, both main memory 128 lines 0000 and 1000 would be mapped to set 0 of 2-way set associative cache 206, and could both be cache-resident within that set. However, if a thread T3 were to access main memory 128 line 0100, either main memory 128 line 0000 or main memory 128 line 1000 would have to be removed from set 0 of 2-way set associative cache 206 in order to make room for main memory 128 line 0100.

The examples above are not meant to be comprehensive discussions of caching. Cache design and usage also includes other factors, such as replacement algorithms, write-back versus write-through tradeoffs, and, in designs with multiple caches, maintaining data coherency between these caches. Other types of cache mappings are also possible.

In addition to improving memory performance through caching, modern computing systems also use virtual memory. In a system supporting virtual memory, physical memory is divided into pages, wherein each page is a contiguous block. Here, physical memory may comprise main memory 128, some portion of main memory 128, or a combination of main memory 128 and some other memory module. Typically, all pages are the same size, but uniform page size is not a requirement. A region of secondary storage 130 may also be divided into pages in the same fashion. As discussed above, a 32-bit CPU may be able to address $2^{32}$ bytes (4 Gigabytes). However, if the system comprises a physical memory with only $2^{28}$ bytes (256 Megabytes), without virtual memory, only $\frac{1}{16}^{th}$ of the system's potential address space can be used. Using virtual memory, all 32 bits of address space can be addressed. Within secondary storage 130, $2^{32}$ bytes are reserved for virtual memory. Assuming a page size of $2^{12}$ bytes (4 Kilobytes), physical memory can be divided into $2^{16}$ pages, and secondary storage 130 can be divided into $2^{20}$ pages. The $2^{20}$ pages of secondary storage 130 can be mapped to any of the $2^{16}$ pages of physical memory. Like caching, physical memory will typically hold pages that are currently being used or have recently been used. A CPU is presented with a 32-bit view of physical memory and may not be aware that physical memory is only $2^{28}$ bits.

Figure 3:
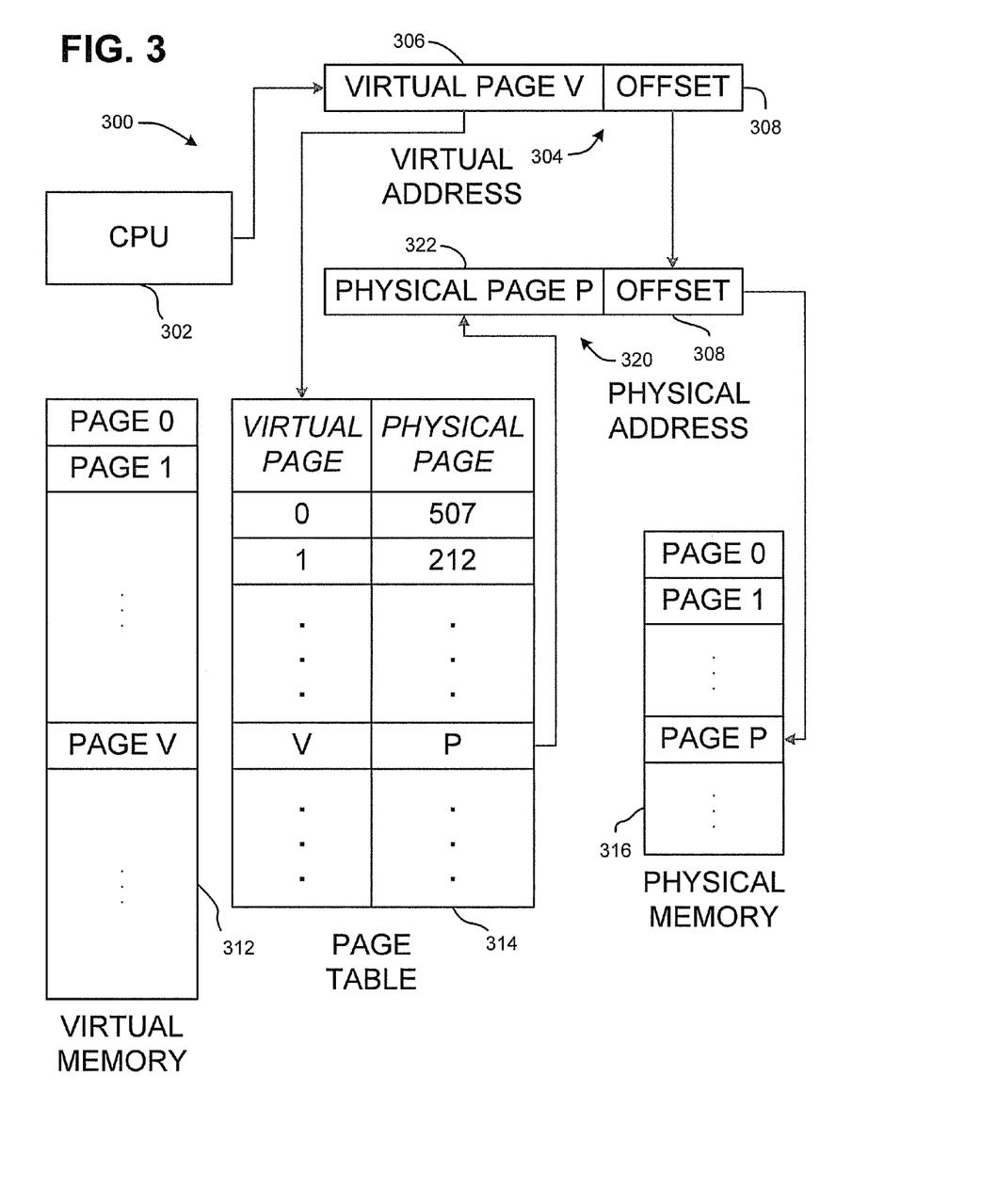
FIG. 3 is a block diagram of a caching system.

An exemplary system 300 encompassing virtual memory is shown in FIG. 3. Exemplary system 300 comprises a CPU 302, virtual memory 312, page table 314, and physical memory 316. When CPU 302 accesses a memory location, it forms a virtual address 304, which comprises a virtual page V 306 and an offset 308 within virtual page V 306. Page table 314 contains mappings of virtual pages to physical pages. For example, virtual page 0 maps to physical page 507 and virtual page 1 maps to physical page 212. Thus, exemplary system 300 uses virtual page V 306 to look up physical page P 322 in page table 314. Offset 308 is concatenated with physical page P 322 to form physical address 320, which is then used to access physical memory 316.

A drawback to virtual memory is that each time a CPU needs to access a memory location, two look ups must occur. First, the system looks up the virtual page to physical page mapping in the page table 314 to acquire physical address 320. Then, the system looks up physical address 320. Both page table 314 and physical address 320 may reside in main memory 128 or secondary storage 130. In order to speed up the translation from virtual addresses to physical addresses, a TLB 124 may be used. TLB 124 is a cache-like memory that only stores parts of page table 314. Thus, by maintaining a copy of recently-accessed page table 314 translations in TLB 124, most of the time only one look up to main memory 128 or secondary storage 130 is required for a memory access.

Virtual memory provides several benefits to an operating system and application programmer. First, virtual memory allows a CPU to address a memory space that is larger than a system's main memory 128 size. This is accomplished by allocating more pages in secondary storage 130 than exist in main memory 128. Second, virtual memory provides each thread with the illusion that it has access to a potentially large amount of contiguous memory, when that memory may cross several pages, and some of those pages may be swapped out to secondary storage 130. Third, virtual memory provides a means of protecting memory used by one thread from interference from another thread. For example, pages used by a particular thread can be marked as accessible only by that thread. This would avoid another thread from reading to or writing from that particular thread's memory.

The systems and processes described in FIGS. 1-3 provide an overview of how caching and virtual memory operate. In the following, improvements to these systems are presented.

Real-time computer systems are subject to constraints that typical computing systems, such as personal computers or enterprise servers, are not designed to handle. Examples of real-time systems include those that control equipment used in avionics, telephony, automobiles, aeronautics, medicine, finance, industrial control, and various military applications. In a real-time system, specific critical threads may need to be able to execute a certain number of times per quantum, or may need to be able to complete execution within a specific amount of time from when they are started. Failure to meet these constraints could result in significant inconvenience to users, financial loss, substantial damage to property, or even loss of life. Thus, one measure of criticality that real-time systems may need to attain is the ability to execute certain threads within a non-varying or minimally-varying time frame.

In order to meet real-time constraints, a system can advantageously manage main memory 128 so that L2 cache 126 thrashing is limited or eliminated for some threads. While some CPUs have the ability to pool caches, more cost-effective systems can be built with off-the-shelf CPU components. Thus, by utilizing mechanisms that allow cache pooling for any CPU or memory subsystem, the same advantages can be realized at lower cost.

Figure 4:
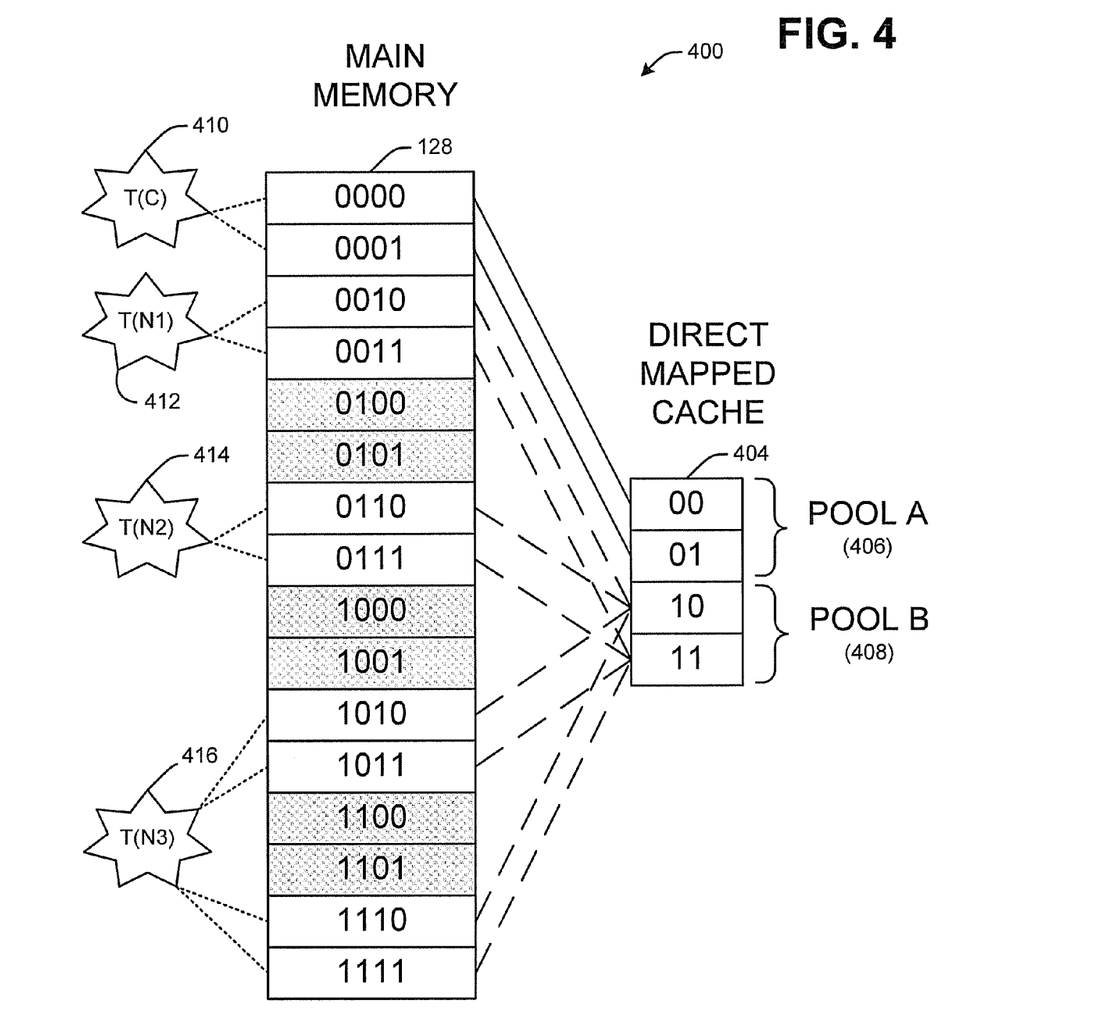
FIG. 4 is a block diagram of a caching system.

In a first embodiment, illustrated in FIG. 4, a system 400 manages main memory 128 and a direct mapped cache 404. Main memory 128 comprises 16 lines and direct mapped cache 404 comprises 4 lines. System 400 further comprises a critical thread, T(C) 410, and a plurality of non-critical threads, T(N1) 412, T(N2) 414, and T(N3) 416.

During operation, it is determined that critical thread T(C) 410 requires a dedicated portion of direct mapped cache 404 for its instructions and data. While many different arrangements of assigning threads to main memory 128 locations can achieve this goal, the following example is used for purposes of illustration. A step in this process includes determining an appropriate partitioning for direct mapped cache 404. As input to this determination, the threads supported in system 400 and their relative criticalities may be considered. Additionally, the dimensions of main memory 128, secondary storage 130, and direct mapped cache 404 may be considered. Other factors may be considered as well.

For sake of illustration and without loss of generality, assume that in system 400, direct mapped cache 404 is divided into two pools, pool A 406 and pool B 408. Assume further that pool A 406 is chosen to be dedicated to critical thread T(C) 410. Eight main memory 128 lines map to pool A 406: 0000, 0001, 0100, 0101, 1000, 1001, 1100, and 1101. Assuming yet further that critical thread T(C) 410 requires two main memory 128 lines to store its instructions and data, another step in the process is to determine to which main memory 128 lines critical thread T(C) 410 should be assigned.

This determination can also take many factors into account. A factor of primary importance is to assign the two main memory 128 lines such that critical thread T(C) 410 so that critical thread T(C) 410 does not contend with itself for the cache. For example, in system 400, of the eight main memory 128 lines map to pool A 406, four (0000, 0100, 1000, 1100) map to direct mapped cache 404 location 00, while the other four (0001, 0101, 1001, 1101) map to direct mapped cache 404 location 01. If critical thread T(C) 410 is assigned two main memory 128 lines both contained in the group 0000, 0100, 1000, 1100 or both contained in the group 0001, 0101, 1001, 1101, critical thread T(C) 410 will not be able to keep all of its instructions and data cache-resident simultaneously. Thus, it is desirable for critical thread T(C) 410 to be assigned one main memory 128 line from the group 0000, 0100, 1000, 1100 and one main memory 128 line from the group 0001, 0101, 1001, 1101. Other factors may be taken into account when making this determination, such as current usage of main memory 128 and the potential dynamic memory needs of critical thread T(C) 410. However the scope of this determination is not limited to just these factors, and yet other factors may be considered as well.

Continuing with the illustrative example of the operation of system 400, assume that critical thread T(C) 410 is assigned to main memory 128 lines 0000 and 0001. This constrains critical thread T(C) 410 to use only direct mapped cache 404 pool A 406. Another step in the process is to assign non-critical threads T(N1) 412, T(N2) 414, and T(N3) 416 to main memory 128 lines. For purposes of illustration, assume that threads T(N1) 412 and T(N2) 414 each require two main memory 128 lines, while thread T(N3) 416 requires four main memory 128 lines. In making this determination, it is preferable for non-critical threads T(N1) 412, T(N2) 414, and T(N3) 416 to not be assigned to any main memory 128 line that maps to pool A 406. This disqualifies main memory 128 lines 0100, 0101, 1000, 1001, 1100, and 1101 (in FIG. 4, these main memory 128 lines are shaded to indicate that they will not be used in exemplary system 400). Thus, non-critical thread T(N1) 412 is assigned to main memory 128 lines 0010 and 0011, non-critical thread T(N2) 414 is assigned to main memory 128 lines 0110 and 0111, and non-critical thread T(N3) 416 is assigned to main memory 128 lines 1010, 1011, 1110, and 1111.

The result of these main memory 128 assignments is that there will be no contention for pool A 406, since only critical thread T(C) 410 will be mapped to it. Thus, critical thread T(C) 410 will exhibit substantially predictable execution behavior. In contrast, all of the non-critical threads will map to and contend for pool B 408, but any such contention or cache thrashing will be transparent to critical thread T(C) 410 and therefore will have limited or no impact any critical events.

Figure 5:
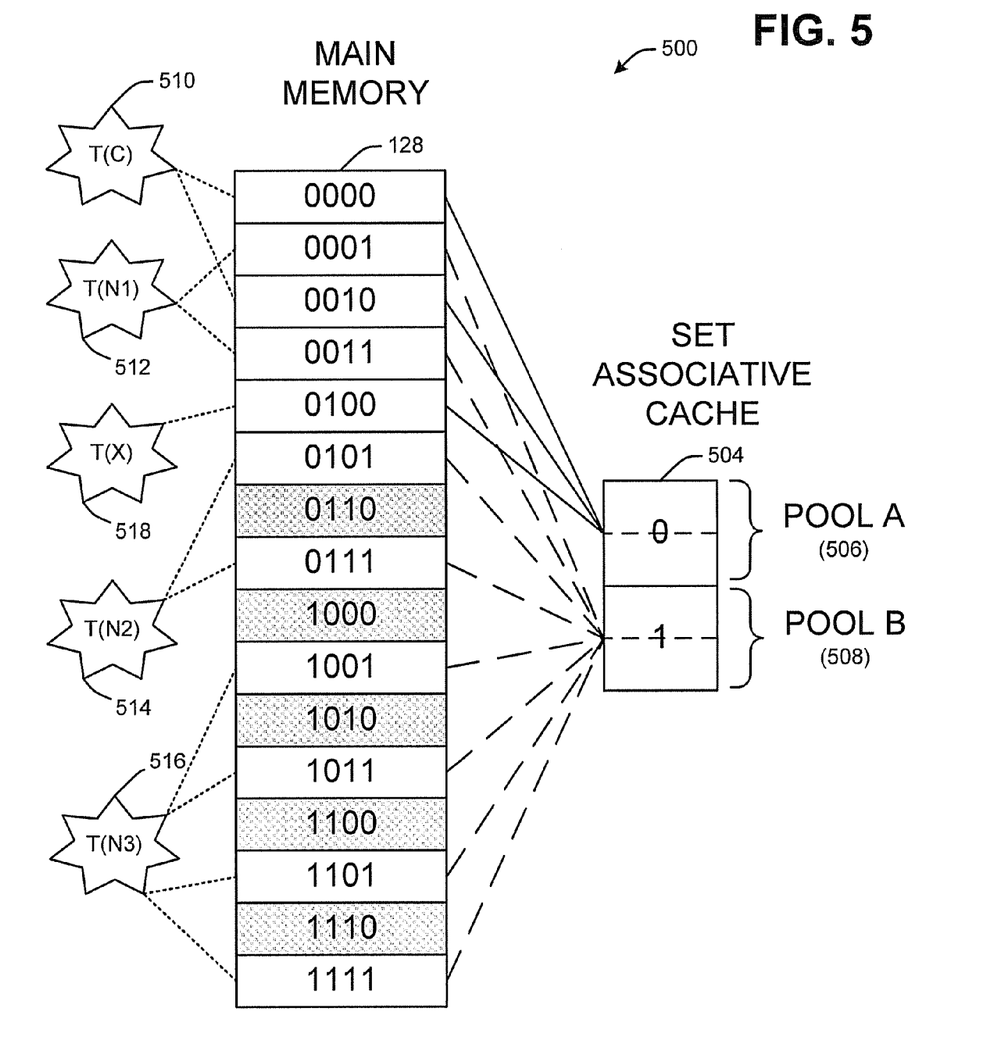
FIG. 5 is a block diagram of a caching system.

FIG. 5 illustrates a second embodiment, wherein system 500 manages a 16-line main memory 128 and a 4-line 2-way set associative cache 504. System 500 further comprises a critical thread, T(C) 510, and a plurality of non-critical threads, T(N1) 512, T(N2) 514, and T(N3) 516. Additionally, system 500 also comprises thread T(X) 518. The operation of system 500 is similar to the operation of system 400, with the exception that system 500 comprises a set associative cache 504, which provides additional flexibility with respect to how main memory 128 assignments can be made. Otherwise, the following exemplary operation of system 500 is analogous to the previous exemplary operation of system 400.

During operation of system 500, it is determined that thread T(C) 510 is a critical thread and requires a dedicated portion of set associative cache 504 for its instructions and data. For sake of illustration and without loss of generality, set associative cache 504 is divided into two pools, pool A 506 and pool B 508. Assume further that pool A 506 is chosen to be dedicated to critical thread T(C) 510. Eight main memory 128 lines map to pool A 506: 0000, 0010, 0100, 0110, 1000, 1010, 1100, and 1110. Assuming yet further that critical thread T(C) 510 requires two main memory 128 lines to store its instructions and data, the another step is to determine to which main memory 128 lines critical thread T(C) 510 should be assigned.

Like the corresponding determination of system 400, this determination can take many factors into account. However, a difference between system 500 and system 400 is that the set associative cache 504 of system 500 allows for some additional flexibility. Similar to system 400, it is preferable for critical thread T(C) 510 to be assigned two main memory 128 lines such that critical thread T(C) 510 does not contend with itself for the cache. However, since set associative cache 504 is two-way, both of the assigned main memory 128 lines can map to the same set in set associative cache 504 without contending with one another. For example, critical thread T(C) 510 could be assigned main memory 128 lines 0000 and 0010 in system 500, whereas in system 400 this assignment would result in contention for direct-mapped cache 404.

Like system 400, other factors may be taken into account when assigning critical thread T(C) 510 to main memory 128 lines, such as current usage of main memory 128 and the potential dynamic memory needs of critical thread T(C) 510. However the scope of this determination is not limited to just these factors, and other factors may be considered as well.

Continuing with the illustrative example of the operation of system 500, assume that critical thread T(C) 510 is assigned to main memory 128 lines 0000 and 0010. This constrains critical thread T(C) 510 to use only set associative cache 504 pool A 506. Then, non-critical threads T(N1) 512, T(N2) 514, and T(N3) 516 are assigned to main memory 128 lines. Similar to system 400, it is advantageous to assign these threads to main memory 128 lines that do not map to pool A 506. Thus, in this example, non-critical thread T(N1) 512 is assigned to main memory 128 lines 0001 and 0011, non-critical thread T(N2) 514 is assigned to main memory 128 lines 0101 and 0111, and non-critical thread T(N3) 516 is assigned to main memory 128 lines 1001, 1011, 1101, and 1111.

Unlike system 400, the flexibility of set associative cache 504 makes it possible that pool A can be shared between critical thread T(C) 510 and another critical or non-critical thread T(X) 518, using memory located at main memory 128 line 0100. For example, if critical thread T(C) 510 only needs to access main memory 128 line 0010 infrequently, then critical thread T(C) 510 and thread T(X) 518 may be able to effectively share cache pool A 506, because it is possible for both main memory 128 lines 0000 and 0100 to be simultaneously cache-resident. In general, if a cache pool with N lines is shared between two threads and one of those threads requires M of those lines, where M<N, then the other thread will be able to use the remaining N-M lines without interfering.

Figure 6:
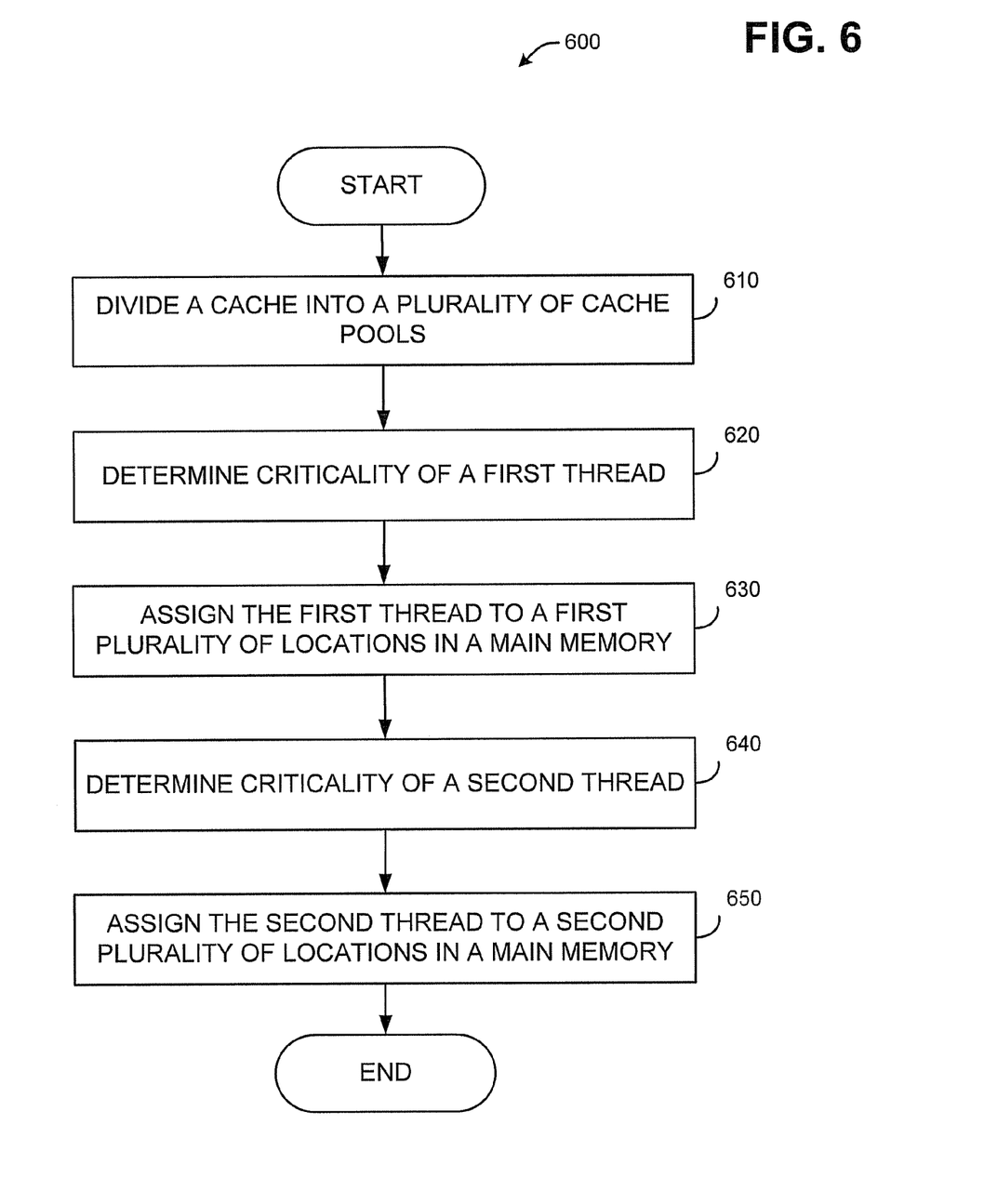
FIG. 6 is a flow chart illustrating a method for cache pooling for computing systems.

FIG. 6 illustrates a method 600 for implementing cache pooling on a multi-threaded system. In step 610 a cache is divided into a plurality of cache pools. These pools may be substantially the same size or may be of various sizes. In step 620, the criticality of a first thread is determined, and in step 630 this first thread is assigned to a plurality of main memory 128 locations. In step 640, the criticality of a second thread is determined, and in step 650 this second thread is assigned to a plurality of main memory 128 locations. The first and second threads may be assigned to main memory 128 locations such that these main memory 128 locations map to disjoint cache pools. For example, when assigning the second thread to main memory 128, the cache pool(s) that the first thread can use may be taken into account so that the second thread will map to different cache pool(s). Other considerations may also be taken into account, including but not limited to, cache pool size, the relative criticalities of the threads, and the number of threads already assigned to each cache pool. For example, a thread may be assigned to memory locations that map to a cache pool based on the size of the cache pool and the memory requirements of the thread.

Figure 7:
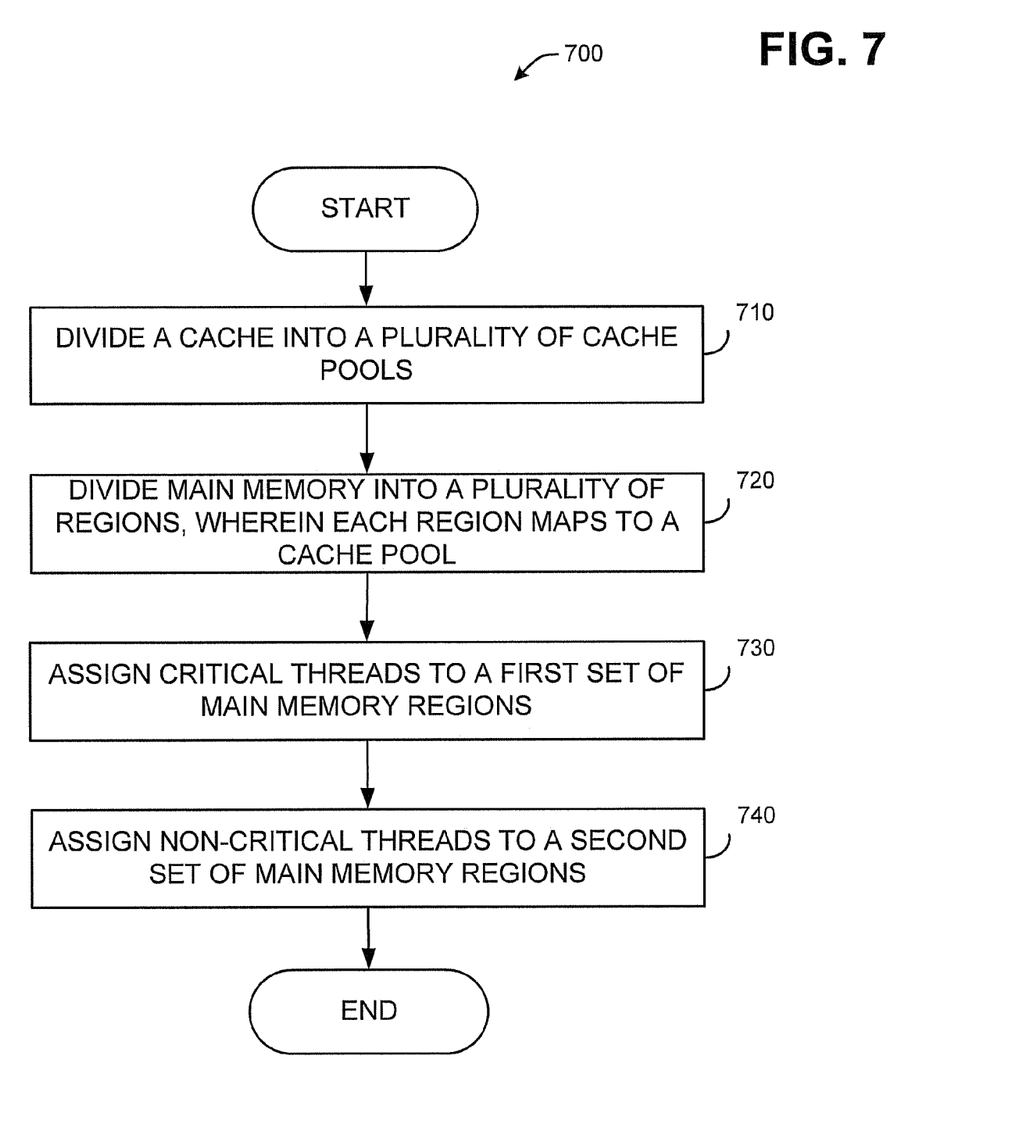
FIG. 7 is a flow chart illustrating a method for cache pooling for computing systems.

FIG. 7 illustrates a method 700 for implementing cache pooling on a multi-threaded system. In step 710 a cache is divided into a plurality of cache pools. In step 720, main memory is divided into a plurality of regions, wherein each region maps to a cache pool. In step 730, critical threads are assigned to a first set of main memory 128 regions, and in step 740, non-critical threads are assigned to a second set of main memory 128 regions. These main memory 128 regions may map to disjoint cache pools, so that critical threads use one or more cache pools, while non-critical threads use a different set of cache pools.

In full generality, these embodiments are not limited to a small number of critical threads, equal-sized cache pools, only two cache pools, leaving certain main memory lines unused, or cache pools encompassing only contiguous cache lines. The system may support multiple critical threads. Each critical thread may be assigned to its own cache pool, may share a cache pool with one or other critical or non-critical threads, or may span multiple cache pools. Before a critical thread shares a cache pool with other threads, a determination may be made in order to ensure that combining the critical thread with other threads will not have a deleterious impact on the system's performance requirements. For example, it may be determined that combining a critical thread with another thread in a particular cache pool is allowable because the pool is large enough so that the threads will not contend frequently with one another, or that their contention will not have a significant performance impact. On the other hand, it may be determined that combining a critical thread with another thread will result in the critical thread exhibiting less predictable performance, and that such combination is undesirable.

When making determinations whether to combine threads in the same cache pool, a number of factors may be taken into account, including but not limited to: criticality of the threads, memory requirements of the threads, CPU requirements of the threads, and behavior of the threads. For the latter, certain threads may behave in a manner that is detrimental to critical threads. In some systems, a thread may run periodically, testing every bit in memory in order to detect potential memory failures. However, in order to test every bit in memory, each bit must be accessed. This results in the cache pool assigned to the thread potentially being completely overwritten. Any critical thread that shares the same cache pool will suffer worst-case latency when the cache is re-filled with its instructions and data. However, non-critical threads may be able to absorb this latency without impairing overall system performance.

The entity making the determinations of how to configure cache pools and assign specific threads into these pools may be, but is not limited to: the operating system, specific hardware components such as a CPU or a cache, an executable program, or a human user. Furthermore, multiple entities may combine to make this determination.

In one example, a human user may fill out a web-based form, specifying the criticality of various threads. A utility program may process the information within this form in conjunction with the hardware characteristics of the system (e.g., main memory 128 size, cache size and associativity, etc.) to create a configuration file. The operating system may use this configuration file to make run-time determinations of how to assign threads to main memory.

In another example, a human user interacts with a utility program that allows the user to specify cache characteristics of the system, such as cache size and cache associativity, as well as the amount of main memory 128 available. The utility program may determine the number of unique main memory 128 regions, each region mapping to a unique group of cache lines. The user may construct cache pools by selecting one or more main memory 128 groups for inclusion into each cache pool.

Further illustrating this example, if there are 64 main memory 128 regions, one cache pool may be configured to have 1 main memory 128 region map to it, whereas another cache pool may be configured to have 32 main memory 128 regions map to it, and a third cache pool may be configured to have 31 main memory 128 regions map to it. A flexible configuration tool will allow cache pools to be created to meet the memory needs and criticality of system functions.

Once the memory configuration is determined, the main memory 128 region that each thread or set of threads will operate in is selected, again based on the criticality and memory needs of each thread. The system can enforce this configuration such that any main memory 128 allocation requested by a given thread will come out of its designated main memory 128 region.

Figure 8:
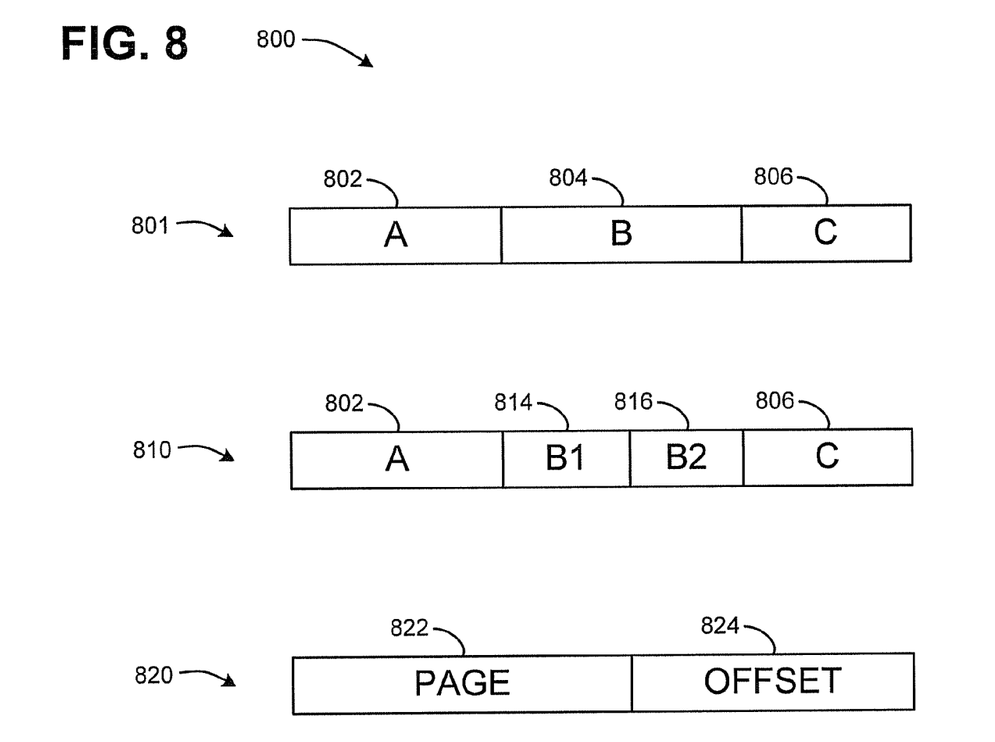
FIG. 8 is a block diagram of a memory addressing system.

A further embodiment involves dividing a cache into cache pools such that thread usage of these cache pools can be enforced by the operating system's virtual memory manager. In FIG. 8, three views 800 of a memory address according to this embodiment are presented. The memory address consists of a number of bits, for example, 16, 32, 64, etc., that index a computing system's memory. Without loss of generality and for purposes of simplification, this embodiment assumes an n-way set associate cache structure. Of course, a direct mapped cache can be considered to be a one-way set associative cache; therefore, this simplification does not limit the scope of the embodiment.

Memory address view 801 divides the memory address into three regions, A 802, B 804, and C 806. Region C 806 defines a byte index within a cache line. Region B 804 defines a cache set index. Region A 802 will be discussed later. All memory addresses for which Region B 804 is the same will be assigned to the same cache set, and therefore will be in the same cache pool. Thus, each bit pattern possible in Region B 804 defines a simple cache pool containing a single cache set.

Memory address view 810 divides the memory address into four regions, A 802, B1 814, B2 816, and C 806, where Regions B1 814 and B2 816 combined are Region B 804 of memory address view 801, and Regions A 802 and C 806 are the same as in memory address view 801. Region B2 816 in combination with Region C 806 defines the offset within a virtual or physical page (see FIG. 3 for an overview of how offsets can be used). Similarly, Region A 802 in combination with region B1 814 defines the memory address's memory page.

For purposes of further illustration, memory address view 820 defines the boundary between the memory page 822 and the offset 824 to be the boundary between Region B1 814 and Region B2 816 of memory address view 810. Accordingly, this embodiment is a further extension of the embodiments previously disclosed. By locating this boundary between Region B1 814 and Region B2 816 as described, this embodiment has the further advantage of defining cache pools such that they are enforceable by an operating system's virtual memory protection mechanisms. The operating system may further rely upon support in hardware for virtual memory protection.

As described above, an operating system will protect a memory page by only allowing certain types of access from a particular thread or threads. Thus, Region B1 814 defines a virtual-memory-enforceable cache pool. In order assign a thread to a given virtual-memory-enforceable cache pool, the operating system locates the thread on physical memory pages that are all within the same virtual-memory-enforceable cache pool. If the thread requires exclusive access to a cache pool, no other threads are assigned to the given virtual-memory-enforceable cache pool. If needed, more than one virtual-memory-enforceable cache pool can be assigned to a thread.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for enabling a computing system, comprising:
   dividing a main memory into a plurality of pools, wherein each of the plurality of pools is associated with a set of one or more lines in a cache;
   determining a criticality of a first thread; and
   assigning the first thread to a first pool of the plurality of pools, wherein the first pool is chosen based on the criticality of the first thread and on the set of one or more lines in the cache that is associated with the first pool.

2. The method of claim 1, further comprising:
   determining a criticality of a second thread; and
   assigning the second thread to a second pool, wherein the second pool is chosen based on the criticality of the first thread, the criticality of the second thread, and the set of one or more lines in the cache that is associated with the second pool.

3. The method of claim 2, wherein the first pool and the second pool are disjoint.

4. The method of claim 2, wherein assigning the second thread to the second pool further comprises choosing the second pool based on the first pool already assigned to the first thread.

5. The method of claim 2, wherein the first pool is associated with a first set of one or more lines in the cache and the second pool is associated with a second set of one or more lines in the cache.

6. The method of claim 1, wherein the plurality of pools comprises unequally-sized pools.

7. The method of claim 1, wherein determining the criticality of the first thread further comprises selecting the criticality of the first thread from a group consisting of real-time criticality and non-real-time criticality.

8. The method of claim 1, wherein the set of one or more lines in the cache associated with the first pool is chosen from a virtual-memory-enforceable set of one or more lines in the cache.

9. The method of claim 1, wherein the first thread is one of a plurality of high criticality and low criticality threads, further comprising:
assigning a plurality of high criticality threads to the first pool associated with a first set of one or more lines in the cache; and
assigning a plurality of low criticality threads to a second pool associated with a second set of one or more lines in the cache, wherein the first set of one or more lines of the cache and the second set of one or more lines of the cache are mutually exclusive.

10. The method of claim 1, wherein assigning the first thread to a first pool is performed by one or more of an operating system associated with the computing system, a software tool, and a utility program configured to interact with a human user.

11. A method for configuring a computing system, wherein the computing system comprises a cache, a main memory, and a plurality of threads, each thread having an associated criticality, the method comprising:
dividing the main memory into a plurality of main memory regions, wherein each main memory region maps to a set of one or more lines in a cache;
assigning the plurality of threads to the plurality of main memory regions based on the criticality of each thread and on the set of one or more lines in the cache that is mapped to each main memory region;
assigning critical threads to a first set of main memory regions from the plurality of main memory regions; and
assigning non-critical threads to a second set of main memory regions from the plurality of main memory regions, wherein the first and second sets of main memory regions map to different sets of one or more lines in the cache.

12. The method of claim 11, wherein at least one of the critical threads is assigned to main memory regions that map to a first set of one or more lines in the cache, wherein no other thread is assigned to main memory regions that map to the first set of one or more lines in the cache.

13. The method of claim 11, wherein at least one of the critical threads is assigned main memory regions that map to two or more sets of one or more lines in the cache.

14. The method of claim 11, wherein at least a first set of one or more lines in the cache is a virtual-memory-enforceable cache pool.

15. A computing system, comprising:
at least one central processing unit;
a cache;
a main memory comprising a plurality of locations, each location mapping to a set of one or more lines in a cache; and
a plurality of threads, each thread having an associated criticality, wherein threads are assigned to main memory locations based on the criticalities of the threads and on the respective set of one or more lines in the cache to which each main memory location is mapped, wherein the threads execute on the at least one central processing unit.

16. The system of claim 15, wherein the criticality associated with each thread comprises one of a high criticality and a low criticality, wherein the plurality of threads being assigned to main memory locations based on the criticalities of the threads further comprises selecting the main memory locations such that the high criticality threads and the low criticality threads are mapped to different sets of one or more lines in a cache.

17. The system of claim 16, wherein at least one of the high criticality threads is assigned main memory regions that map to a first set of one or more lines in the cache, wherein no other thread is assigned to main memory regions that map to the first set of one or more lines in the cache.

18. The system of claim 15, wherein at least a first set of lines in the cache is a virtual-memory-enforceable cache pool.

19. The system of claim 15, wherein the associated criticality of each thread is selected from a group consisting of real-time criticality and non-real-time criticality.

* * * * *